(12) United States Patent
Matsuno et al.

(10) Patent No.: US 11,916,262 B2
(45) Date of Patent: Feb. 27, 2024

(54) ALLOY MEMBER, CELL STACK, AND CELL STACK DEVICE

(71) Applicant: NGK INSULATORS, LTD., Nagoya (JP)

(72) Inventors: Yuta Matsuno, Nagoya (JP); Yuki Tanaka, Nagoya (JP); Toshiyuki Nakamura, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/187,802

(22) Filed: Mar. 22, 2023

(65) Prior Publication Data

US 2023/0223558 A1    Jul. 13, 2023

Related U.S. Application Data

(60) Division of application No. 16/728,352, filed on Dec. 27, 2019, now Pat. No. 11,695,126, which is a
(Continued)

(30) Foreign Application Priority Data

| Sep. 7, 2018 | (JP) | 2018-168073 |
| Oct. 22, 2018 | (JP) | 2018-198664 |
| Jan. 23, 2019 | (JP) | 2019-009259 |

(51) Int. Cl.
*H01M 8/2485* (2016.01)
*H01M 8/0208* (2016.01)
(Continued)

(52) U.S. Cl.
CPC ....... *H01M 8/0208* (2013.01); *H01M 8/0217* (2013.01); *H01M 8/0228* (2013.01);
(Continued)

(58) Field of Classification Search
CPC .................. H01M 8/0208; H01M 8/2483
See application file for complete search history.

(56) References Cited

U.S. PATENT DOCUMENTS

| 11,081,705 B2 | 8/2021 | Tanaka et al. |
| 11,522,202 B2 | 12/2022 | Tanaka et al. |

(Continued)

FOREIGN PATENT DOCUMENTS

| JP | 5315476 B1 | 10/2013 |
| JP | 5395303 B1 | 1/2014 |

(Continued)

OTHER PUBLICATIONS

Japanese Office Action with English translation issued in Japanese Application No. 2019-009259, dated Mar. 12, 2019 (10 pages).
(Continued)

*Primary Examiner* — Mark Ruthkosky
*Assistant Examiner* — Julia L Rummel
(74) *Attorney, Agent, or Firm* — FLYNN THIEL, P.C.

(57) ABSTRACT

An alloy member includes a base member that includes a recess in a surface of the base member and is constituted by an alloy material containing chromium, an anchor portion is disposed in the recess and contains an oxide containing manganese and a covering layer is connected to the anchor portion and contains a low-equilibrium oxygen pressure element whose equilibrium oxygen pressure is lower than that of chromium.

6 Claims, 9 Drawing Sheets

Related U.S. Application Data continuation of application No. PCT/JP2019/034571, filed on Sep. 3, 2019.

(51) Int. Cl.
    *H01M 8/2483*   (2016.01)
    *H01M 8/0217*   (2016.01)
    *H01M 8/0228*   (2016.01)

(52) U.S. Cl.
    CPC ....... *H01M 8/2483* (2016.02); *H01M 8/2485* (2013.01); *Y02E 60/50* (2013.01)

(56) References Cited

U.S. PATENT DOCUMENTS

| | | | |
|---|---|---|---|
| 2015/0155571 A1 | 6/2015 | Higashi | |
| 2016/0233524 A1 | 8/2016 | Leah et al. | |

FOREIGN PATENT DOCUMENTS

| | | | |
|---|---|---|---|
| JP | 201535418 A | 2/2015 | |
| JP | 6188181 B1 | 8/2017 | |
| JP | 6343728 B1 | 6/2018 | |
| WO | 2013172451 A1 | 11/2013 | |

OTHER PUBLICATIONS

International Search Report with English Translation issued in International Application No. PCT/JP2019/034571 dated Nov. 19, 2019 (5 pages).

Notice of Reasons for Revocation with English translation for Japanese Application No. 2019-700706 (U.S. Pat. No. 6,484,382), dated Jan. 8, 2020 (23 pages).

Lei Chen et al., Strontium transport and conductivity of $Mn1.5Co1.5O4$ coated Haynes 230 and Crofer 22 APU under simulated solid oxide fuel condition, Solid State Ionics, 204-205 (2011), p. 111-119, Oct. 28, 2011 (10 pages).

Chun-Lin Chu et al., Oxidation behavior of metallic interconnect coated with La—Sr—Mn film by screen painting and plasma sputtering, International Journal of Hydrogen Energy 34 (2009) 422-434, Jan. 21, 2008 (14 pages).

Hiroaki Tagawa, Solid Oxide Fuel Cell and Global Environment, 1st edition, Agne Shofusha Co., Ltd., cover, p. 40-43, with partial English translation , Jul. 25, 2010 (6 pages).

Maria J. Balart et al., Melt Protection of Mg—Al Based Alloys, metals 2016, 6, 131, MDPI, p. 1-11, May 30, 2016 (12 pages).

English Translation of the International Preliminary Report on Patentability, issued in International Application No. PCT/JP2019/034571, dated Mar. 18, 2021 (6 pages).

Written Opinion of International Searching Authority issued in corresponding International Application No. PCT/JP2019/034571, dated Nov. 19, 2019 (3 pages).

Notice of Patent Opposition Petition with partial English translation for Japanese Application No. 2019-700706 (U.S. Pat. No. 6,484,382) dated Sep. 5, 2019 (49 pages).

Kathy Riggs Larsen, Alumina-Forming Austenitic Alloys Resist High-Temperature Corrosion, Materials Performance, pp. 1-14, May 4, 2020 (14 pages).

Magnex, Magnex SOFC Interconnector, SOFC Interconnector/Fuel Cell Materials, Magnetic Heads—MAGNEX Co., Ltd., (2016) pp. 1-3 (3 pages).

Pawel Huczkowski et al., Effect of geometry and composition of Cr Steels on oxide scale properties relevant for interconnector applications in Solid Oxide Fuel Cells (SOFCs) Forschungszentrum Jülich in der helmholtz—Gemeinschaft, 2007, vol. 65, pp. 1-172, (185 pages).

ALLOY MEMBER, CELL STACK, AND CELL STACK DEVICE

CROSS-REFERENCE TO RELATED APPLICATIONS

This is a divisional of prior U.S. Ser. No. 16/728,352, filed Dec. 27, 2019, which is a continuation of PCT/JP2019/034571, filed Sep. 3, 2019, which claims priority to Japanese Application No. 2018-168073, filed Sep. 7, 2018, Japanese Application No. 2019-009259, filed Jan. 23, 2019, and Japanese Application No. 2018-198664, filed Oct. 22, 2018, the entire contents of which are hereby incorporated by reference.

TECHNICAL FIELD

The present invention relates to an alloy member, a cell stack, and a cell stack device.

BACKGROUND ART

A cell stack device provided with a cell stack in which a plurality of fuel cells are electrically connected to each other by current collector members, and a manifold for supporting the fuel cells is conventionally known (see Patent Literatures 1 and 2).

An alloy member is used in the current collector member and the manifold.

The manifold disclosed in JP 2015-035418A is provided with a covering layer covering the surface of a base member constituted by stainless steel in order to inhibit the volatilization of Cr (chromium) from the base member.

The current collector member disclosed in WO 2013/172451 is provided with a covering layer covering the surface of a base member constituted by an Fe—Cr-based alloy, a Ni—Cr-based alloy, or the like in order to inhibit the volatilization of Cr from the base member.

Also, in WO 2013/172451, it is possible to inhibit the separation of the covering layer from the base member as a result of a portion of a chromium oxide layer formed between the base member and the covering layer entering recesses of the surface of the base member.

SUMMARY

However, with the current collector member disclosed in WO 2013/172451, chromium oxide grows greatly as a result of the oxidation of the base member that surrounds the chromium oxide embedded in the recesses progressing during the operation of the cell stack device.

As a result, chromium oxide having a tapered shape before the operation has started has a round shape during the operation and the anchor effect will decrease, and thus there is a risk that the covering layer will separate from the base member.

The present invention was made in view of the above-described circumstances and an object thereof is to provide an alloy member, a cell stack, and a cell stack device capable of improving durability.

An alloy member according to the present invention includes a base member that includes a recess in a surface of the base member and is constituted by an alloy material containing chromium, an anchor portion that is disposed in the recess and contains an oxide containing manganese, and a covering layer that is connected to the anchor portion and contains a low-equilibrium oxygen pressure element whose equilibrium oxygen pressure is lower than that of chromium.

According to the present invention, it is possible to provide an alloy member, a cell stack, and a cell stack device capable of improving durability.

DESCRIPTION OF EMBODIMENTS

An embodiment of a cell stack device according to this embodiment will be described with reference to the drawings.

Cell Stack Device 100

Figure 1:
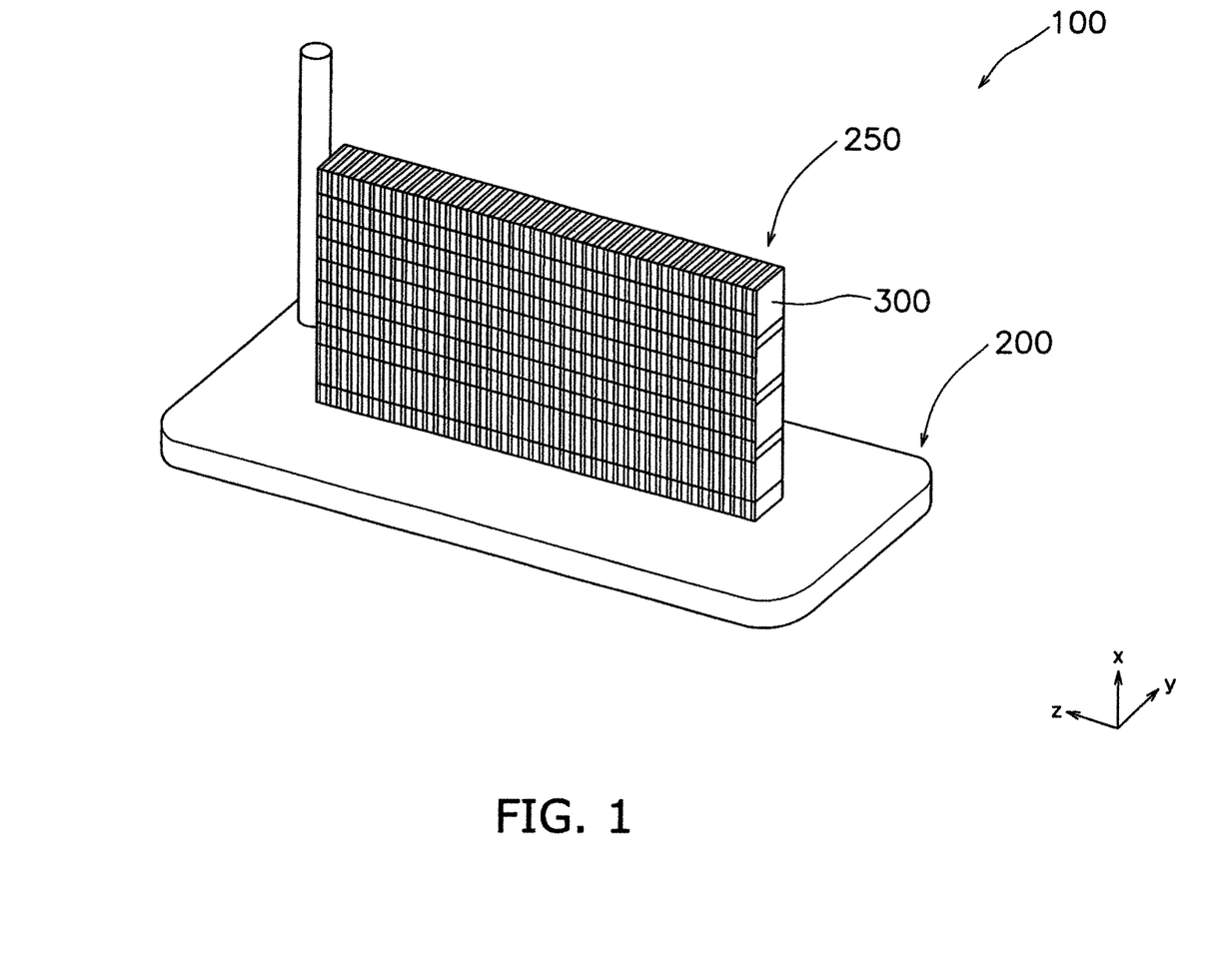
FIG. 1 is a perspective view of a cell stack device.

FIG. 1 is a perspective view of a cell stack device 100. The cell stack device 100 includes a manifold 200 and a cell stack 250.

Manifold 200

Figure 2:
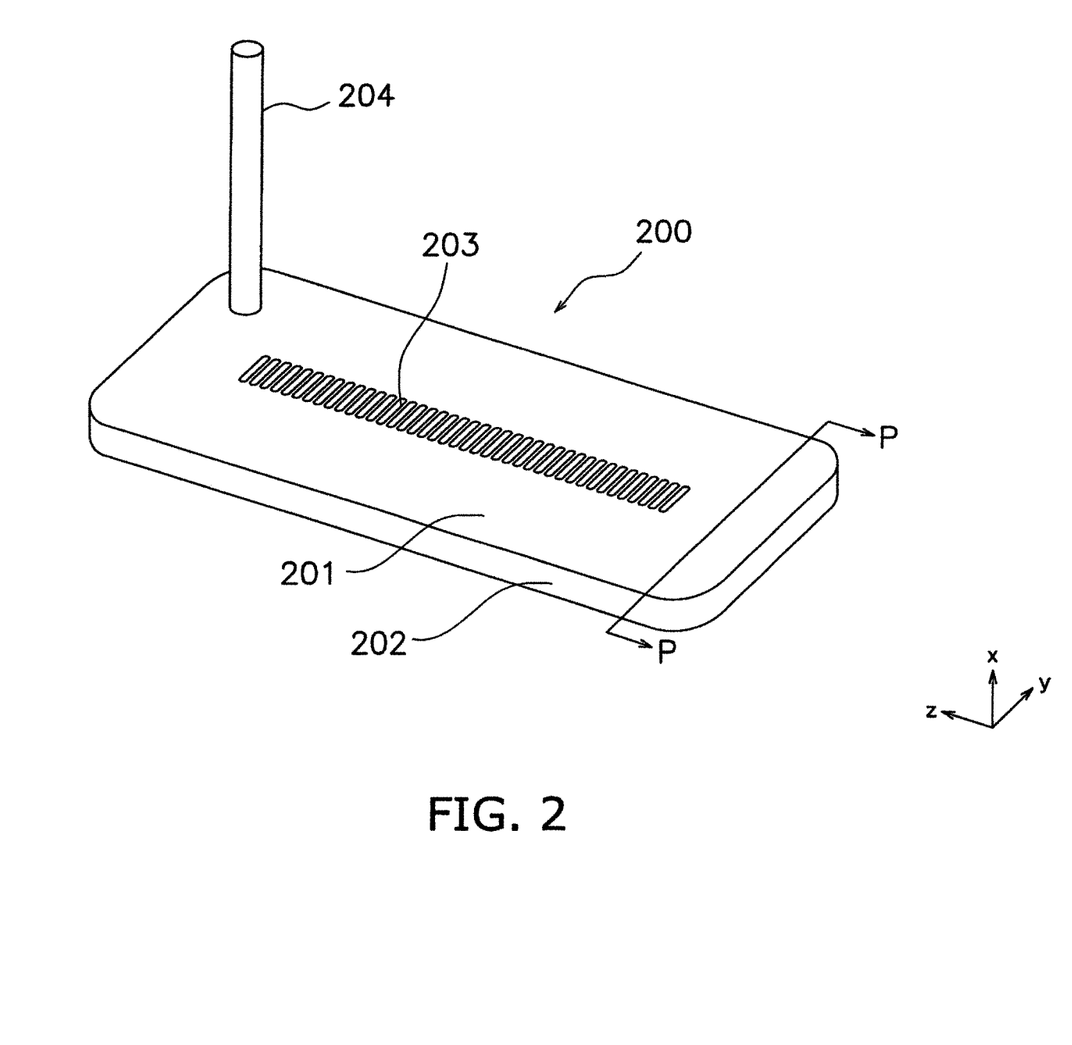
FIG. 2 is a perspective view of a manifold.

FIG. 2 is a perspective view of the manifold 200. The manifold 200 is an example of an "alloy member".

The manifold 200 is configured to distribute a fuel gas (e.g., hydrogen) to fuel cells 300. The manifold 200 is hollow and has an internal space. Fuel gas is supplied to the internal space of the manifold 200 via an introduction pipe 204.

The manifold 200 includes a top plate 201 and a container 202. The top plate 201 is formed into a flat plate shape. The container 202 is formed into a cup shape. The top plate 201 is disposed to cover an upper opening of the container 202.

Figure 6:
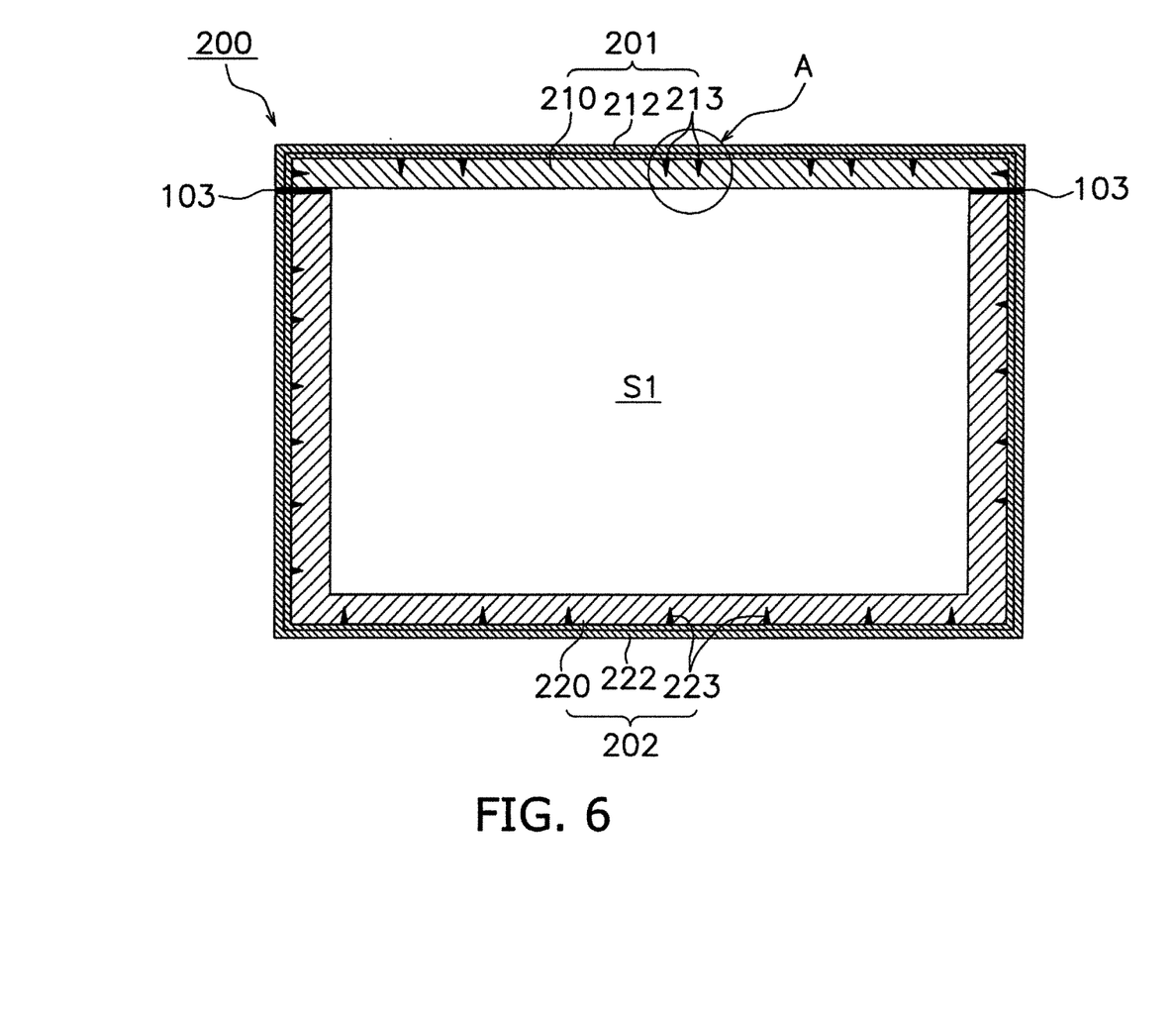
FIG. 6 is a cross-sectional view taken along P-P shown in FIG. 2.

The top plate 201 is bonded to the container 202 by a bonding material 103 (not shown in FIG. 2, see FIG. 6). Examples of the bonding material 103 include crystallized glass, amorphous glass, brazing materials, and ceramic materials. In this embodiment, crystallized glass refers to a glass in which the ratio of "the volume of a crystal phase" to the total volume (the degree of crystallinity) is 60% or more, and the ratio of "the volume of an amorphous phase and impurities" to the total volume is less than 40%. Examples of such crystallized glass include $SiO_2$—BaO-based, $SiO_2$—CaO-based, and MgO—CaO-based glass.

The top plate 201 is provided with a plurality of insertion holes 203. The insertion holes 203 are arranged in the direction in which the fuel cells 300 are arranged (the Z-axis direction). The insertion holes 203 are disposed apart from each other. The insertion holes 203 are in communication with the internal space of the manifold 200 and the outside.

A configuration of the manifold 200 will be described in detail later.

Cell Stack 250

Figure 3:
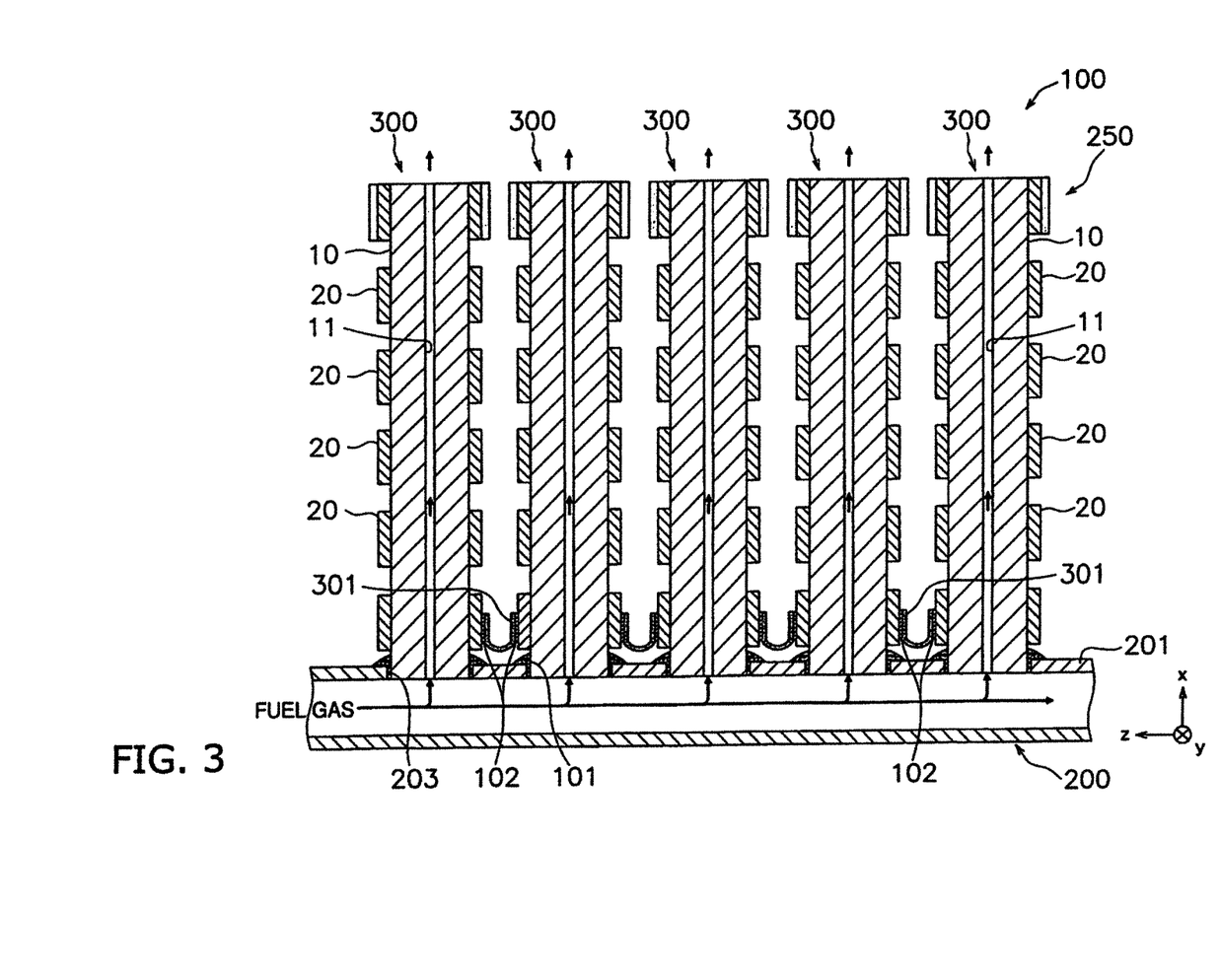
FIG. 3 is a cross-sectional view of the cell stack device.

FIG. 3 is a cross-sectional view of the cell stack device 100. The cell stack 250 includes a plurality of fuel cells 300 and a plurality of current collector members 301.

The fuel cells 300 extend from the manifold 200. Specifically, the fuel cells 300 extend upward (the X-axis direction) from the top plate 201 of the manifold 200. Although the length of each fuel cell 300 in the longitudinal direction (the X-axis direction) may be about 100 to 300 mm, the length thereof is not limited thereto.

Base end portions of the fuel cells 300 are inserted into the insertion holes 203 of the manifold 200. The fuel cells 300 are fixed to the insertion holes 203 by the bonding material 101. The fuel cells 300 are fixed to the manifold 200 by the bonding material 101 in a state in which the fuel cells 300 are inserted into the insertion holes 203. Gaps between the fuel cells 300 and the insertion holes 203 are filled with the bonding material 101. Examples of the bonding material 101 include crystallized glass, amorphous glass, brazing materials, and ceramic materials.

Each fuel cell 300 is formed into a plate shape extending in the longitudinal direction (the X-axis direction) and the width direction (the Y-axis direction). The fuel cells 300 are arranged at intervals in the direction in which the fuel cells 300 are arranged (the Z-axis direction). Although there is no particular limitation on the intervals between two adjacent fuel cells 300, the intervals therebetween may have a length of about 1 to 5 mm.

Each fuel cell 300 internally has a gas channel 11. Fuel gas (hydrogen etc.) is supplied from the manifold 200 to the gas channels 11, and an oxidant gas (air etc.) is supplied to the peripheries of the fuel cells 300 during the operation of the cell stack device 100.

Two adjacent fuel cells 300 are electrically connected to each other by the current collector member 301. The current collector member 301 is bonded to base ends of two adjacent fuel cells 300 via bonding materials 102. The bonding material 102 may be at least one selected from $(Mn, Co)_3O_4$, $(La, Sr)MnO_3$, and $(La, Sr)(Co, Fe)O_3$, for example.

Fuel Cell 300

Figure 4:
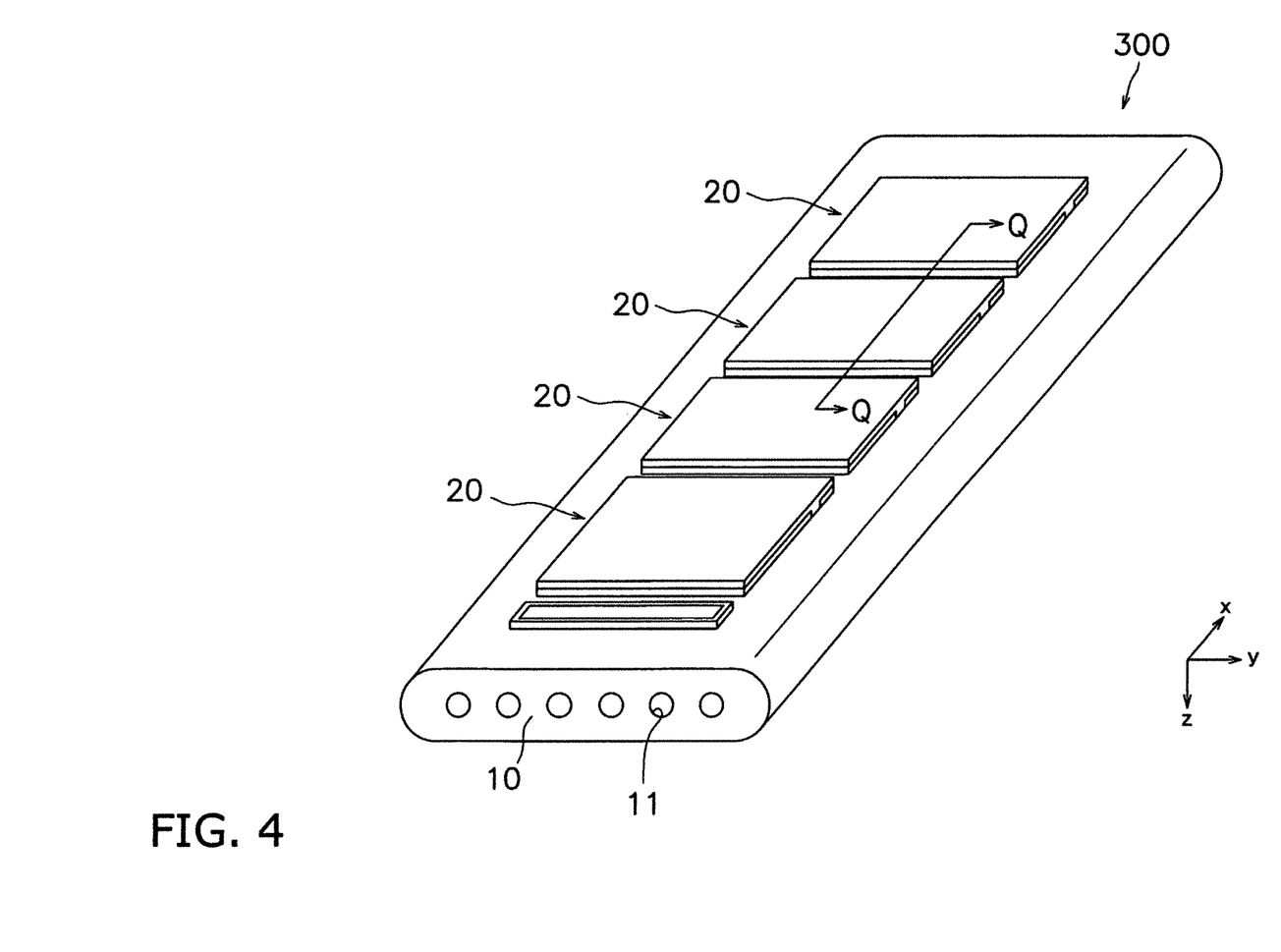
FIG. 4 is a perspective view of a fuel cell.
Figure 5:
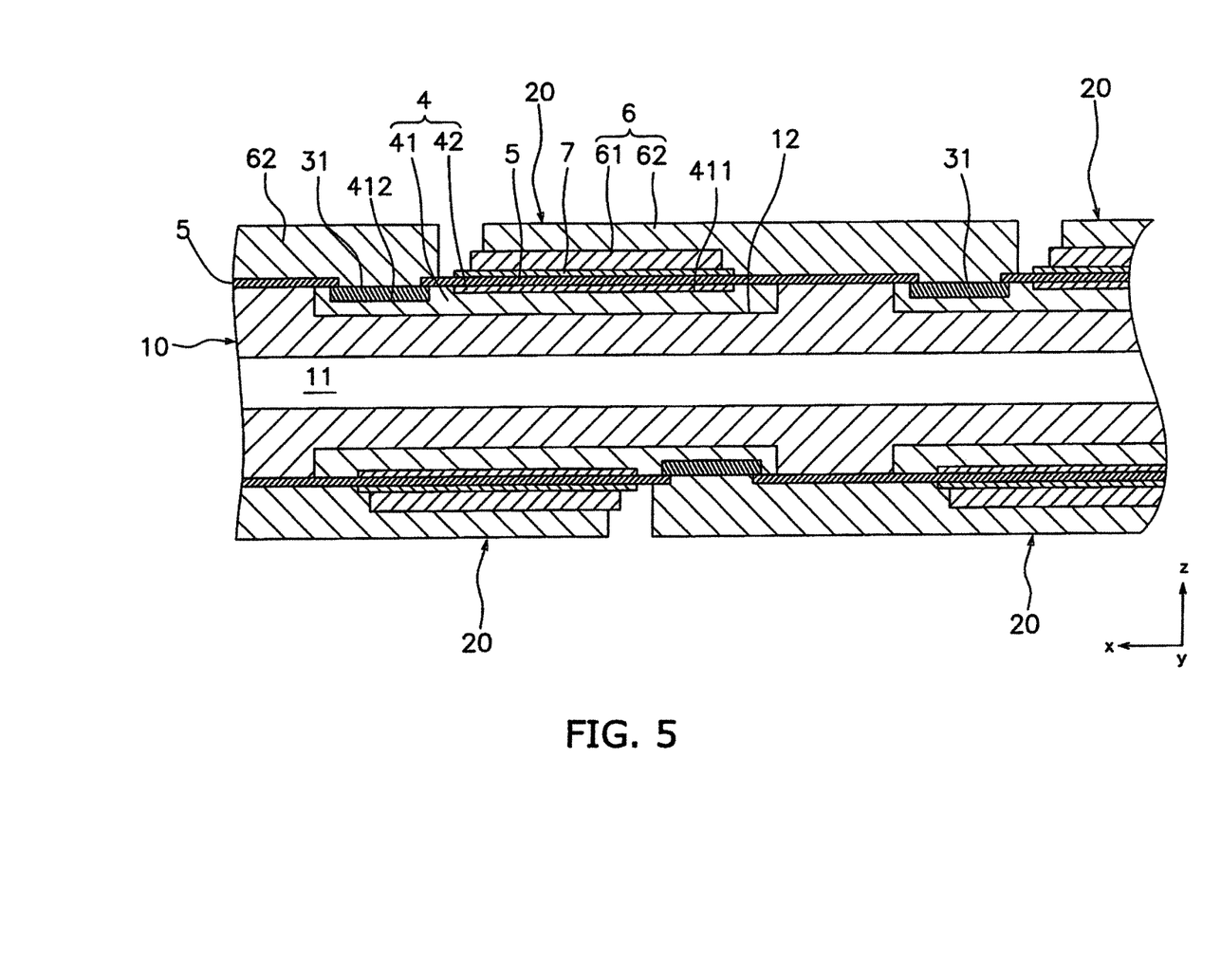
FIG. 5 is a cross-sectional view taken along Q-Q shown in FIG. 4.

FIG. 4 is a perspective view of a fuel cell 300. FIG. 5 is a cross-sectional view thereof taken along Q-Q shown in FIG. 4.

The fuel cell 300 includes a support substrate 10 and a plurality of power generation element portions 20.

Support Substrate 10

The support substrate 10 internally includes a plurality of gas channels 11 extending in the longitudinal direction (the X-axis direction) of the support substrate 10. The gas channels 11 extend from the base end side of the support substrate 10 toward the leading end side. The gas channels 11 extend substantially in parallel to each other.

As shown in FIG. 5, the support substrate 10 has a plurality of first recesses 12. In this embodiment, the first recesses 12 are formed in both main surfaces of the support substrate 10 but may be formed in only one main surface. The first recesses 12 are disposed apart from each other in the longitudinal direction of the support substrate 10.

The support substrate 10 is constituted by a porous material that does not have an electron conductivity. The support substrate 10 may be constituted by CSZ (calcia-stabilized zirconia), for example. Alternatively, the support substrate 10 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 10 has a porosity of about 20% to 60%, for example.

Power Generation Element Portion 20

The power generation element portions 20 are supported by the support substrate 10. In this embodiment, the power generation element portions 20 are formed on both main surfaces of the support substrate 10 but may be formed on only one main surface. The power generation element portions 20 are disposed apart from each other in the longitudinal direction of the support substrate 10. That is, the fuel cells 300 according to this embodiment are so-called horizontal-stripe type fuel cells. Power generation element portions 20 that are adjacent to each other in the longitudinal direction are electrically connected to each other by an interconnector 31.

The power generation element portions 20 include fuel electrodes 4, electrolytes 5, air electrodes 6, and reaction preventing layers 7.

The fuel electrode 4 is a sintered body constituted by a conductive porous material. The fuel electrode 4 includes a fuel electrode current collector portion 41 and a fuel electrode active portion 42.

The fuel electrode current collector portion 41 is disposed in the first recess 12. Specifically, the first recess 12 is filled with the fuel electrode current collector portion 41 and the fuel electrode current collector portion 41 has the same outer shape as the first recess 12. The fuel electrode current collector portions 41 each have a second recess 411 and a third recess 412. The fuel electrode active portion 42 is disposed in the second recess 411. Also, the interconnector 31 is disposed in the third recess 412.

The fuel electrode current collector portion 41 has an electron conductivity. The fuel electrode current collector portion 41 preferably has an electron conductivity that is higher than that of the fuel electrode active portion 42. The air electrode current collector portion 41 may have or need not have oxygen ion conductivity.

The fuel electrode current collector portion 41 may be constituted by NiO (nickel oxide) and YSZ (8YSZ) (yttria-stabilized zirconia), for example. Alternatively, the fuel electrode current collector portion 41 may also be constituted by NiO (nickel oxide) and $Y_2O_3$ (yttria), or NiO (nickel oxide) and CSZ (calcia-stabilized zirconia). The fuel electrode current collector portion 41 has a thickness of about 50 to 500 μm and the first recess 12 have a depth of about 50 to 500 μm.

The fuel electrode active portion 42 has an oxygen ion conductivity and electron conductivity. The content of a substance having an oxygen ion conductivity in the fuel electrode active portion 42 is higher than that in the fuel electrode current collector portion 41. Specifically, the ratio of the volume of the substance having an oxygen ion conductivity in the fuel electrode active portion 42 to the total volume of the fuel electrode active portion 42 excluding pore portions is larger than the ratio of the volume of the substance having an oxygen electron conductivity in the fuel electrode current collector portion 41 to the total volume of the fuel electrode current collector portion 41, excluding pore portions.

The fuel electrode active portion 42 may be constituted by NiO (nickel oxide) and YSZ (8YSZ) (yttria-stabilized zirconia), for example. Alternatively, the fuel electrode active portion 42 may also be constituted by NiO (nickel oxide) and GDC (gadolinium doped ceria). The fuel electrode active portion 42 has a thickness of 5 to 30 μm.

The electrolyte 5 is disposed covering the fuel electrode 4. Specifically, the electrolyte 5 extends in the longitudinal direction from a given interconnector 31 to an adjacent interconnector 31. That is, the electrolytes 5 and the interconnectors 31 are disposed in an alternating manner in the longitudinal direction (the X-axis direction) of the support substrate 10. The electrolyte 5 is configured to cover both main surfaces of the support substrate 10.

The electrolyte 5 is a sintered body constituted by a compact material having an ionic conductivity and no electron conductivity. The electrolyte 5 may be constituted by YSZ (8YSZ) (yttria-stabilized zirconia), for example. Alternatively, the electrolyte 5 may also be constituted by LSGM (lanthanum gallate). The electrolyte 5 has a thickness of about 3 to 50 μm, for example.

The air electrode 6 is a sintered body constituted by a conductive porous material. The air electrode 6 is disposed opposite to the fuel electrode 4 with respect to the electrode 5. The air electrode 6 includes an air electrode active portion 61 and an air electrode current collector portion 62.

The air electrode active portion 61 is disposed on the reaction preventing layer 7. The air electrode active portion 61 has an oxygen ion conductivity and electron conductivity. The content of a substance having an oxygen ion conductivity in the air electrode active portion 61 is higher than that in the air electrode current collector portion 62. Specifically, the ratio of the volume of the substance having an oxygen ion conductivity in the air electrode active portion 61 to the total volume of the air electrode active portion 61, excluding pore portions, is larger than the ratio of the volume of the substance having an oxygen electron conductivity in the air electrode current collector portion 62 to the total volume of the air electrode current collector portion 62, excluding pore portions.

The air electrode active portion 61 may be constituted by LSCF=(La, Sr) (Co, Fe)$O_3$ (lanthanum strontium cobalt ferrite), for example. Alternatively, the air electrode active portion 61 may also be constituted by LSF=(La, Sr)Fe$O_3$ (lanthanum strontium ferrite), LNF=La(Ni, Fe)$O_3$ (lanthanum nickel ferrite), LSC=(La, Sr) Co$O_3$ (lanthanum strontium cobaltite), or the like. The air electrode active portion 61 may be constituted by two layers of a first layer (inner layer) constituted by LSCF and a second layer (outer layer) constituted by LSC. The air electrode active portion 61 has a thickness of 10 to 100 μm, for example.

The air electrode current collector portion 62 is disposed on the air electrode active portion 61. Also, the air electrode current collector portion 62 extends from the air electrode active portion 61 toward the adjacent power generation element portion. The fuel electrode current collector portion 41 and the air electrode current collector portion 62 extend in opposite directions from a power generation region. The power generation region refers to a region where the fuel electrode active portion 42, the electrolyte 5, and the air electrode active portion 61 overlap each other.

The air electrode current collector portion 62 is a sintered body constituted by a conductive porous material. The air electrode current collector portion 62 preferably has an electron conductivity that is higher than that of the air electrode active portion 61. The air electrode current collector portion 62 may have or need not have an oxygen ion conductivity.

The air electrode current collector portion 62 may be constituted by LSCF=(La, Sr)(Co, Fe)$O_3$ (lanthanum strontium cobalt ferrite), for example. Alternatively, the air electrode current collector portion 62 may also be constituted by LSC=(La, Sr)Co$O_3$ (lanthanum strontium cobaltite). Alternatively, the air electrode current collector portion 62 may also be constituted by Ag (silver) or Ag—Pd (a silver palladium alloy). The air electrode current collector portion 62 has a thickness of about 50 to 500 μm, for example.

The reaction preventing layer 7 is a sintered body constituted by a compact material. The reaction preventing layer 7 is disposed between the electrolyte 5 and the air electrode active portion 61. The reaction preventing layer 7 is provided in order to suppress the occurrence of a phenomenon in which a reaction layer with large electric resistance is formed at an interface between the electrolyte 5 and the air electrode 6 through a reaction between YSZ in the electrolyte 5 and Sr in the air electrode 6.

The reaction preventing layer 7 is constituted by a material containing ceria containing a rare earth element. The reaction preventing layer 7 may be constituted by GDC= (Ce, Gd)$O_2$ (gadolinium doped ceria), for example. The reaction preventing layer 7 has a thickness of about 3 to 50 μm, for example.

The interconnector 31 is configured to electrically connect power generation element portions 20 that are adjacent to each other in the longitudinal direction (the X-axis direction) of the support substrate 10. Specifically, the air electrode current collector portion 62 of one power generation element portion 20 extends toward another power generation element portion 20. Also, the fuel electrode current collector portion 41 of the other power generation element portion 20 extends toward the one power generation element portion 20. Also, the interconnector 31 electrically connects the air electrode current collector portion 62 of the one power generation element portion 20 and the fuel electrode current collector portion 41 of the other power generation element portion 20. The interconnector 31 is disposed in the third recess 412 of the fuel electrode current collector portion 41. Specifically, the interconnector 31 is embedded in the third recess 412.

The interconnector 31 is a sintered body constituted by a conductive compact material. The interconnector 31 may be constituted by LaCr$O_3$ (lanthanum chromite), for example. Alternatively, the interconnector 31 may also be constituted by (Sr, La)Ti$O_3$ (strontium titanate). The interconnector 31 has a thickness of 10 to 100 μm, for example.

Detailed Configuration of Manifold 200

Figure 7:
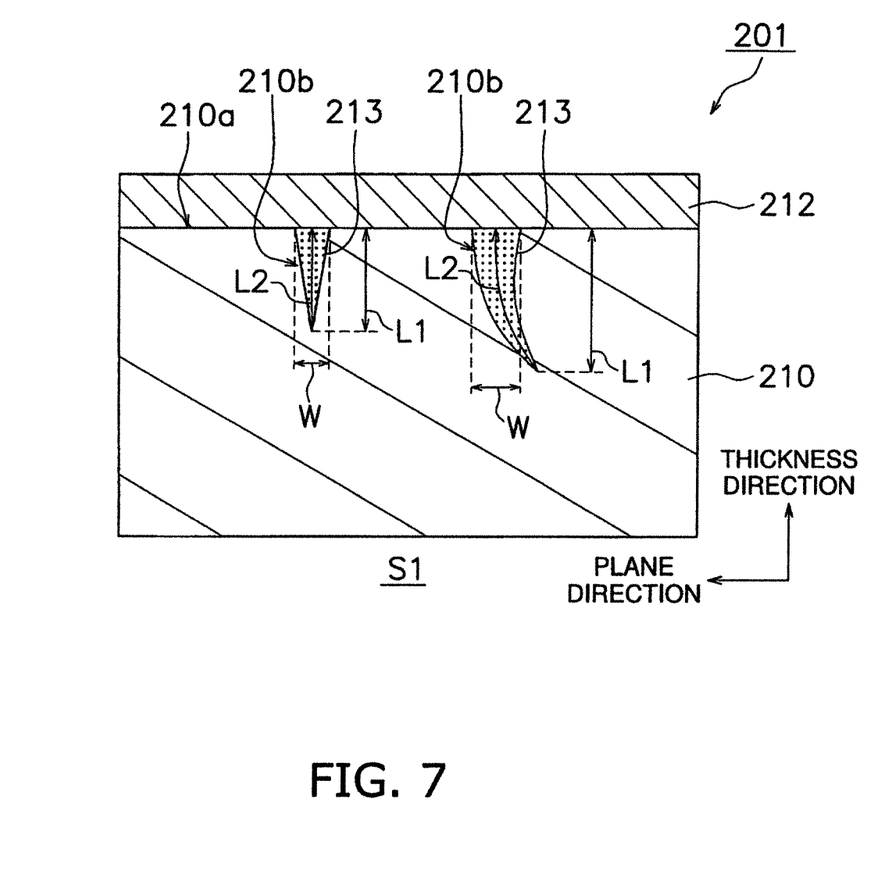
FIG. 7 is an enlarged view of a region A shown in FIG. 6.

Next, a detailed configuration of the manifold 200 will be described with reference to the drawings. FIG. 6 is a cross-sectional view taken along P-P shown in FIG. 2. FIG. 7 is an enlarged view of a region A shown in FIG. 6.

The top plate 201 is bonded to the container 202 by the bonding material 103. An internal space S1 into which fuel gas is supplied is formed between the top plate 201 and the container 202.

The top plate 201 includes a base member 210, a covering layer 212, and anchor portions 213. The container 202 includes a base member 220, a covering layer 222, and anchor portions 223.

The top plate 201 and the container 202 are examples of the "alloy member". The base member 210 and the base member 220 are examples of the "base member". The covering layer 212 and the covering layer 222 are examples of the "covering layer". The anchor portions 213 and the anchor portions 223 are examples of the "anchor portion".

Because the configuration of the container 202 is the same as the configuration of the top plate 201, the configuration of the top plate 201 will be described below with reference to FIG. 7.

The base member 210 is formed into a plate shape. The base member 210 may have a flat plate shape or a curved plate shape. Although there is no particular limitation on the thickness of the base member 210, the thickness thereof may be 0.5 to 4.0 mm, for example.

The base member 210 is constituted by an alloy material containing Cr (chromium). An Fe—Cr-based alloy steel (stainless steel etc.), a Ni—Cr-based alloy steel, or the like may be used as a metal material. Although there is no particular limitation on the Cr content in the base member 210, the Cr content may be 4 to 30 mass %, for example.

The base member 210 may contain Ti (titanium) and Al (aluminum). Although there is no particular limitation on the Ti content in the base member 210, the Ti content may be 0.01 to 1.0 at. %. Although there is no particular limitation on the Al content in the base member 210, the Al content may be 0.01 to 0.4 at. %. The base member 210 may contain Ti as $TiO_2$ (titania), and Al as $Al_2O_3$ (alumina).

The base member 210 has a surface 210a and recesses 210b. The surface 210a is an outer surface of the base member 210. The surface 210a faces the covering layer 212. The recesses 210b are formed in the surface 210a.

Although there is no particular limitation on the number of recesses 210b, the recesses 210b are preferably widely distributed in the surface 210a. Also, although there is no particular limitation on the intervals between recesses 210b, it is particularly preferable that the recesses 210b are disposed at equal intervals. Accordingly, the anchor effect resulting from the anchor portions 213, which will be described later, can be evenly exerted on the covering layer 212, thus particularly inhibiting separation of the covering layer 212 from the base member 210.

There is no particular limitation on the cross-sectional shape of the recess 210b, and the cross-sectional shape thereof may be a wedge shape, a semicircular shape, a rectangular shape, and other complex shapes, for example. The recess 210b may extend straight toward the inner portion of the base member 210, may be formed obliquely with respect to the thickness direction perpendicular to the surface 210a, or may be partially curved. The deepest portion of the recess 210b may have an acute angle, an obtuse angle, or a round shape. FIG. 7 shows, as an example, a wedge-shaped recess 210b that extends straight toward the inner portion of the base member 210 (the left side in FIG. 7), and a wedge-shaped recess 210b that extends while curving toward the inner portion of the base member 210 (the right side in FIG. 7).

The covering layer 212 covers at least a portion of the base member 210. Specifically, the covering layer 212 covers at least a portion of a region of the base member 210 that comes into contact with an oxidant gas during the operation of the cell stack device 100. The covering layer 212 preferably covers the entire surface of the region of the base member 210 that comes into contact with the oxidant gas. Although there is no particular limitation on the thickness of the covering layer 212, the thickness thereof may be 3 to 200 μm, for example.

The covering layer 212 inhibits Cr from volatilizing from the surface 210a of the base member 210. This makes it possible to inhibit the electrodes (the air electrodes 6 in this embodiment) of the fuel cells 300 from deteriorating through Cr poisoning.

A ceramic material can be used as a material constituting the covering layer 212. A specific type of ceramic material can be suitably selected as appropriate according to a portion to which the ceramic material is applied. Because the covering layer 212 is applied to the manifold 200 that needs to have insulating properties in this embodiment, alumina, silica, zirconia, and crystallized glass (e.g., $SiO_2$—CaO-based, $SO_2$—BaO-based, MgO—CaO-based, MgO—$B_2O_3$-based, and $SiO_2$—$B_2O_3$-based glass), or a combination thereof can be used as the ceramic material, for example. Also, if the covering layer 212 is applied to a current collector member that needs to be conductive, perovskite complex oxides containing La and Sr, spinel complex oxides constituted by transition metals such as Mn, Co, Ni, Fe, and Cu, or the like can be used as the ceramic material. However, the covering layer 212 needs only to inhibit the volatilization of Cr, and the material constituting the covering layer 212 is not limited to the above-described ceramic material.

The covering layer 212 is connected to the anchor portions 213, which will be described later. The covering layer 212 contains an element whose equilibrium oxygen pressure is lower than the equilibrium oxygen pressure of Cr (referred to as a "low-equilibrium oxygen pressure element" hereinafter). The low-equilibrium oxygen pressure element whose equilibrium oxygen pressure is lower than that of Cr can take oxygen that permeates the covering layer 212 into the inner portion of the covering layer 212 due to the low-equilibrium oxygen pressure element having a greater affinity for oxygen than Cr, and thus the low-equilibrium oxygen pressure element can reduce the oxygen partial pressure of the vicinities of the anchor portions 213. Thus, it is possible to inhibit Cr included in the regions of the base member 210 that surround the anchor portions 213 from being oxidized by oxygen that has permeated the covering layer 212. As a result, it is possible to maintain the forms of the anchor portions 213 for a long period of time, and thus to obtain the anchor effect resulting from the anchor portions 213 for a long period of time. Thus, it is possible to inhibit the separation of the covering layer 212 from the base member 210 for a long period of time, and thus to improve the durability of the top plate 201 (an example of the alloy member).

The content of the low-equilibrium oxygen pressure elements in the covering layer 212 may be 0.01 or more in terms of a cation ratio when a molar ratio of the elements to all elements (however, the oxygen element is excluded) that constitute the covering layer 212 is defined as the cation ratio. It is preferable that the content of the low-equilibrium oxygen pressure elements in the covering layer 212 is 0.05 or more in terms of the cation ratio. This makes it possible to further inhibit the separation of the covering layer 212. Note that the covering layer 212 may contain two or more types of low-equilibrium oxygen pressure elements, and in this case, the content of the low-equilibrium oxygen pressure elements refers to the sum of the contents of the two or more types of low-equilibrium oxygen pressure elements.

The content of the low-equilibrium oxygen pressure elements in the covering layer 212 can be obtained as a result of measuring, using EDS, in terms of the cation ratio, the contents of the low-equilibrium oxygen pressure elements at five points at which the thickness of the covering layer 212 is divided into six portions and arithmetically averaging the contents of the low-equilibrium oxygen pressure elements measured at the five points.

The covering layer 212 may contain Mn (manganese) as the low-equilibrium oxygen pressure element. In this case, it is possible to improve the adherence to the anchor portions 213 containing oxides containing Mn, and thus to inhibit the separation of the anchor portions 213 from the covering layer 212. As a result, it is possible to further inhibit the separation of the covering layer 212 from the base member 210.

The covering layer 212 may contain, as the low-equilibrium oxygen pressure element, an element whose equilibrium oxygen pressure is lower than the equilibrium oxygen pressure of Mn. In this case, it is possible to further reduce the oxygen partial pressure of the vicinities of the anchor portions 213, and thus to further inhibit the separation of the covering layer 212 from the base member 210 for a long period of time.

The anchor portions 213 are disposed in the recesses 210b of the base member 210. The anchor portions 213 are connected to the covering layer 212 near opening portions of the recesses 210b. Accordingly, the anchor effect arises as a result of the anchor portions 213 being locked to the recesses 210b, thus improving the adhesive force of the covering layer 212 to the base member 210. As a result, it is possible to inhibit the separation of the covering layer 212 from the base member 210.

Although the anchor portion 213 needs only to be in contact with at least a portion of the inner surface of the recess 210b, the anchor portion 213 is more preferably in contact with substantially the entire inner surface of the recess 210b.

Although there is no particular limitation on the vertical length L1 of the anchor portion 213 in the thickness direction perpendicular to the surface 210a of the base member 210, the vertical length L1 may be 0.1 μm to 300 μm inclusive, for example. As shown in FIG. 7, the vertical length L1 refers to the total length of a portion of the anchor 213 that is embedded in the recess 210b in the thickness direction that is perpendicular to the surface 210a of the base member 210. As shown in FIG. 7, the anchor portions 213 may have different vertical lengths L1 or may have the same vertical length L1.

Also, it is preferable that the vertical length L1 of the anchor portion 213 is larger than the bonding width W of the anchor portion 213 and the coating layer 212 in a cross-section along the thickness direction. The bonding width W refers to the total length of a tangent line between the anchor portion 213 and the coating layer 212 in a cross section of the base member 210 along the thickness direction. Although there is no particular limitation on the bonding width W, the bonding width W is preferably 0.1 μm or more. Accordingly, the bonding strength between the anchor portion 213 and the covering layer 212 is increased, thus inhibiting the anchor portion 213 from breaking away from the covering layer 212. As a result, it is possible to further inhibit the separation of the covering layer 212 from the base member 210.

Although there is no particular limitation on the actual length L2 of the anchor portion 213 in the direction in which the anchor portion 213 extends, the actual length L2 may be 0.2 μm to 600 μm inclusive, for example. The actual length L2 refers to the total length of a line obtained by connecting midpoints of the anchor portion 213 in the surface direction that is parallel to the surface 210a of the base member 210, from a base end portion to a leading end portion thereof. Thus, the actual length L2 indicates a different concept from the vertical length L1. In the example shown in FIG. 7, with the left anchor portion 213, the actual length L2 is equal to the vertical length L1, whereas with the right anchor portion 213, the actual length L2 is longer than the vertical length L1.

The anchor portion 213 contains oxides containing Mn. Although examples of oxides containing Mn include MnO and $MnCr_2O_4$, for example, the examples thereof are not limited thereto. Mn is an element whose equilibrium oxygen pressure is lower than that of Cr, and has a greater affinity for oxygen than Cr, and thus the anchor portions 213 can preferentially take the oxygen that permeates the covering layer 212 during the operation of the cell stack device 100. Thus, it is possible to inhibit the oxidation of Cr included in regions of the base member 210 that surround the anchor portions 213, and thus to maintain the forms of the anchor portions 213 for a long period of time. As a result, it is possible to obtain the anchor effect resulting from the anchor portions 213 for a long period of time, and thus to inhibit the separation of the covering layer 212 from the base member 210 for a long period of time. Note that, as described above, because the permeation of oxygen through the covering layer 212 is inhibited due to the covering layer 212 containing low-equilibrium oxygen pressure elements, the effect for inhibiting the separation of the covering layer 212 is further improved due to a synergistic effect therewith in the top plate 201 (an example of the alloy member) according to this embodiment.

The content of Mn in the anchor portion 213 may be 0.01 or more in terms of a cation ratio when a molar ratio of the elements to all elements (however, the oxygen element is excluded) that constitute the anchor portion 213 is defined as the cation ratio. The Mn content of the anchor portion 213 is preferably 0.05 or more, and more preferably 0.10 or more, in terms of the cation ratio. This makes it possible to further inhibit the oxidation of Cr and to maintain the forms of the anchor portions 213 for a longer period of time.

The Mn content of the plurality of anchor portions 213 formed in the top plate 201 can be obtained as follows. First, for each of the twenty anchor portions 213 selected at random, the Mn content is measured in terms of the cation ratio using EDS at ten points at which the actual length L2 is divided into eleven portions. Then, for each of the twenty anchor portions 213, the maximum value is selected from the Mn contents measured at the ten points. Then, the maximum values of the Mn contents selected for each of the twenty anchor portions 213 are arithmetically averaged. The value obtained by arithmetic averaging refers to the Mn content in the anchor portions 213. Note that if twenty anchor portions 213 cannot be observed in one cross-section of the top plate 201, twenty anchor portions 213 need only to be selected from a plurality of cross-sections thereof.

The anchor portion 213 may contain oxides including Al (aluminum), Ti (titanium), Ca (calcium), Si (silicon), and the like, in addition to oxides containing Mn. Because these elements have a lower equilibrium oxygen pressure than Cr, similarly to the above-described oxide containing Mn, the effect of maintaining the forms of the anchor portions 213 can be expected.

Also, the anchor portion 213 partially contains a chromium oxide. However, the chromium content in the anchor portion 213 is preferably 0.95 or less, and is more preferably 0.90 or less, in terms of the cation ratio.

Although there is no particular limitation on the number of anchor portions 213, one hundred or more anchor portions 213 are preferably observed in a 10 mm length of a surface of the base member in the observation of a cross-section of the surface, and two hundred or more anchor portions 213 are more preferably observed in a 10 mm length thereof. Accordingly, the anchor effect resulting from the anchor portions 213 can be sufficiently increased, thus further inhibiting separation of the covering layer 212 from the base member 210.

Method for Manufacturing Manifold 200

A method for manufacturing the manifold 200 will be described with reference to the drawings. Note that a method for manufacturing the container 202 is the same as a method for manufacturing the top plate 201 and thus the method for manufacturing the top plate 201 will be described below.

Figure 8:
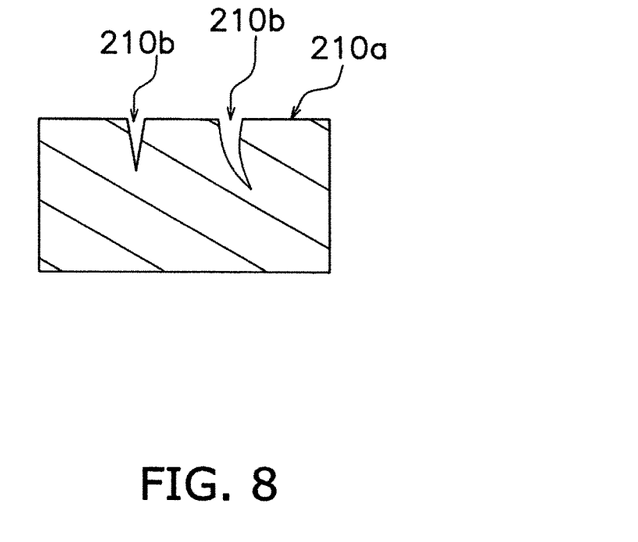
FIG. 8 is a diagram illustrating a method for manufacturing a manifold.

First, as shown in FIG. 8, recesses 210b are formed in the surface 210a of the base member 210. It is possible to efficiently form wedge-shaped recesses 210b using sand blasting, for example. At this time, the depth and the width of the recesses 210b are adjusted by adjusting the particle size of a polishing agent, or leveling the surface using a roller as appropriate. Accordingly, it is possible to adjust the vertical length L1, the actual length L2, and the bonding width W of the anchor portions 213 to be formed later.

Figure 9:
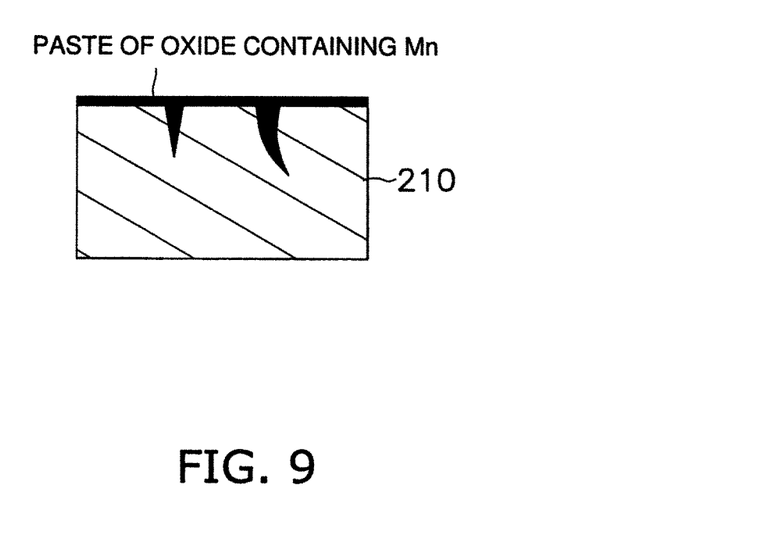
FIG. 9 is a diagram illustrating a method for manufacturing the manifold.

Then, as shown in FIG. 9, a paste of oxides containing a low-equilibrium oxygen pressure element is applied onto the surface 210a of the base member 210. Accordingly, the inner portions of the recesses 210b are filled with the paste of oxides containing the low-equilibrium oxygen pressure element. Note that the paste of oxides containing the low-equilibrium oxygen pressure element can be prepared by adding ethyl cellulose and terpineol to a powder of oxides containing the low-equilibrium oxygen pressure element.

Figure 10:
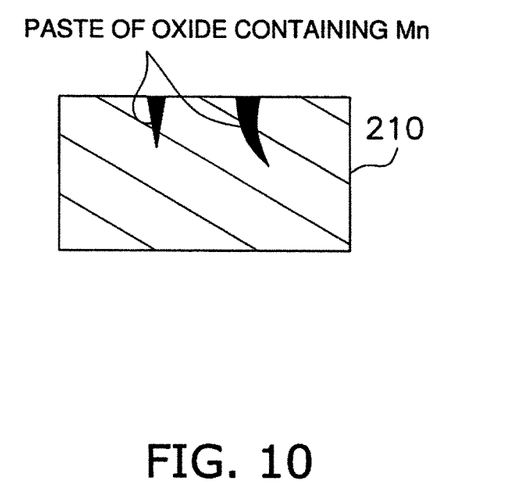
FIG. 10 is a diagram illustrating a method for manufacturing the manifold.

Then, as shown in FIG. 10, by removing the excess paste applied onto the surface 210a using a squeegee, for example, the paste remains only in the inner portions of the recesses 210b.

Figure 11:
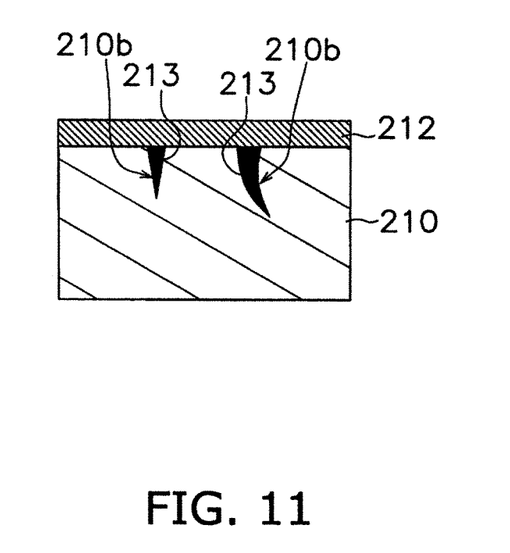
FIG. 11 is a diagram illustrating a method for manufacturing the manifold.

Then, as shown in FIG. 11, the covering layer 212 is formed by applying an insulating ceramic material paste containing a low-equilibrium oxygen pressure element onto the surface 210a of the base member 210 and performing heat treatment (800° C. to 1100° C., 1 to 5 hours).

OTHER EMBODIMENTS

The present invention is not limited to the above-described embodiments and various changes and modifications can be made without departing from the scope of the present invention.

Variation 1

Although the alloy member according to the present invention is applied to the manifold 200 in the above-described embodiment, the configuration thereof is not limited thereto. The alloy member according to the present invention can be used as a member constituting portions of the cell stack device 100 and the cell stack 250. The alloy member according to the present invention can be applied to the current collector member 301 that is electrically connected to the fuel cell 300, for example. If the alloy member according to the present invention is applied to the current collector member 301, because the electrical resistivity of oxides containing Mn is lower than the electrical resistivity of a chromium oxide ($Cr_2O_3$), it is possible to keep the electrical current flow in the base member 210 from being inhibited by the anchor portions 213, compared to the case where the anchor portions 213 are constituted by the chromium oxide. As a result, it is possible to inhibit the base member 210 from locally generating heat as a result of an electrical current being concentrated at a specific portion, and thus to inhibit deterioration of the alloy member. If the alloy member according to the present invention is applied to the current collector member in this manner, the effect of inhibiting the deterioration of the alloy member can also be expected, in addition to the effect of inhibiting the separation of the covering layer 212.

Variation 2

Although the cell stack 250 includes horizontal-stripe type fuel cells in the above-described embodiment, the cell stack 250 may include vertical-stripe type fuel cells. A vertical-stripe type fuel cell includes a conductive support substrate, a power generation portion (a fuel electrode, a solid electrolyte layer, and an air electrode) disposed on one main surface of the support substrate, and an interconnector disposed on the other main surface of the support substrate.

Variation 3

Although the anchor portions 213 are disposed in the recesses 210b in the above-described embodiment, if the base member 210 includes a plurality of recesses 210b, there may be a recess 210b in which the anchor portion 213 is not disposed.

Variation 4

Although the anchor portions 213 are connected to the covering layer 212 in the above-described embodiment, if a plurality of anchor portions 213 are present, there may be an anchor portion 213 that is not connected to the covering layer 212.

Variation 5

Although the case where the alloy member according to the present invention is applied to a cell stack of fuel cells, which are examples of an electrochemical cell, has been described in the above-described embodiment, the alloy member according to the present invention can be applied to a cell stack of electrochemical cells including an electrolytic cell for generating hydrogen and oxygen from water vapor.

EXAMPLES

Although examples of the alloy member according to the present invention will be described hereinafter, the present invention is not limited to the examples described below.

Production of Examples 1 to 24

Alloy members described using FIGS. 7 to 11 were produced as follows.

First, a plate member made of SUS430 was prepared as a base member.

Then, a plurality of recesses were formed in the surface of the base member by performing sand blasting on the surface of the base member.

Then, a paste for an anchor portion was prepared by adding ethyl cellulose and terpineol to oxides containing Mn. At this time, as shown in Table 1, the cation ratio of Mn (the molar ratio of Mn to the elements other than oxygen) in the anchor portions was changed for each sample by adjusting the amount of added oxides containing Mn.

Then, the recesses were filled with the paste for an anchor portion by applying the prepared paste for an anchor portion onto the surface of the base member, and then the excess paste for an anchor portion remaining on the surface of the base member was removed using a squeegee.

Then, a paste for a covering layer was prepared by adding ethyl cellulose and terpineol to a powder of oxides of the low-equilibrium oxygen pressure elements shown in Table 1. At this time, as shown in Table 1, the cation ratio of low-equilibrium oxygen pressure elements (the molar ratio of the low-equilibrium oxygen pressure elements to the elements other than oxygen) in the covering layer was changed for each sample by adjusting the amount of the added low-equilibrium oxygen pressure elements.

Then, a covering layer was formed by applying the prepared paste for a covering layer onto the surface of the base member and performing heat treatment (800° C. to 1100° C., 1 to 5 hours).

Production of Comparative Examples 1 to 3

Alloy members according to Comparative Examples 1 to 3 were produced in the processes that were the same as those of Examples 1 to 24, except that a paste for a covering layer was prepared using a powder of oxides of an element whose equilibrium oxygen pressure was higher than that of Cr.

Mn Content in Anchor Portion

With regard to Examples 1 to 24 and Comparative Examples 1 to 3, the Mn content (the cation ratio) of the anchor portion was measured as follows.

First, twenty anchor portions were selected at random from a cross-section of the base member along the thickness direction, and the Mn content of each anchor portion was measured in terms of the cation ratio using EDS at ten points at which the actual length L2 (see FIG. 7) was divided into eleven portions.

Then, the Mn content of the anchor portions was calculated as a result of selecting, for each of the twenty anchor portions, the maximum value from the Mn contents measured at the ten points, and arithmetically averaging the selected twenty maximum values.

Content of Low-Equilibrium Oxygen Pressure Elements in Covering Layer

With regard to Examples 1 to 24 and Comparative Examples 1 to 3, the content (the cation ratio) of a low-equilibrium oxygen pressure element in the covering layer was measured as follows.

First, the content of a low-equilibrium oxygen pressure element in the covering layer was calculated as a result of measuring, in a cross-section of the covering layer along the thickness direction, using EDS, in terms of the cation ratio, the contents of the low-equilibrium oxygen pressure elements at five points at which the thickness of the covering layer was divided into six portions, and arithmetically averaging the five measured values.

As shown in Table 1, with Comparative Examples 1 to 3, no low-equilibrium oxygen pressure element was detected.

Note that the cation ratio of Co in the covering layer of Comparative Example 1 was 0.85, the cation ratio of Ni in the covering layer of Comparative Example 2 was 0.88, and the cation ratio of Fe in the covering layer of Comparative Example 3 was 0.91.

Observation of Separation of Covering Layer

With regard to Examples 1 to 24 and Comparative Examples 1 to 3, an observation of separation of the covering layer was carried out through simulation of an actual usage environment.

First, the produced alloy member was introduced into an electric furnace and a heating and cooling cycle was repeated 50 times in an atmosphere. The heating and cooling cycle included a heating process of increasing the temperature to 850° C. at a temperature increase rate of 200° C./h and holding the temperature at 850° C. for 30 minutes and a cooling process of reducing the temperature to 100° C. at a temperature reduce rate of 200° C./h and holding the temperature at 100° C. for 30 minutes.

The occurrence of the separation of a covering layer was checked by observing the surfaces of the alloy members using a SEM (an electron microscope). Also, whether the weight of an alloy member changed (the weight thereof decreased) was checked by measuring the weight of the alloy member. In Table 1, an alloy member in which separation accompanied by a weight change was observed was evaluated as C, an alloy member in which only a slight separation that was not accompanied by a weight change was observed was evaluated as B, and an alloy member in which no separation was observed was evaluated as A.

TABLE 1

| | Anchor Portion Mn content (cation ratio) | Covering layer Material | Content of low-equilibrium oxygen pressure element (cation ratio) | Evaluation Determination of Separation of Covering layer |
|---|---|---|---|---|
| No. | | | | |
| Ex. 1 | 0.2 | $(Mn,Co)_3O_4$ | 0.85 | A |
| Ex. 2 | 0.71 | $(Mn,Co)_3O_4$ | 0.38 | A |
| Ex. 3 | 0.09 | $(Mn,Co)_3O_4$ | 0.05 | A |
| Ex. 4 | 0.81 | $(Mn,Co)_3O_4$ | 0.04 | B |
| Ex. 5 | 0.62 | $(Mn,Co)_3O_4$ | 0.03 | B |
| Ex. 6 | 0.13 | $(Mn,Co)_3O_4$ | 0.01 | B |
| Ex. 7 | 0.08 | $(Mn,Co,Zn)_3O_4$ | 0.68 | A |
| Ex. 8 | 0.02 | $(Mn,Co,Zn)_3O_4$ | 0.22 | A |
| Ex. 9 | 0.41 | $(Mn,Co,Zn)_3O_4$ | 0.05 | A |
| Ex. 10 | 0.19 | $(Mn,Co,Zn)_3O_4$ | 0.04 | B |
| Ex. 11 | 0.26 | $(Mn,Co,Zn)_3O_4$ | 0.02 | B |
| Ex. 12 | 0.56 | $(Mn,Co,Zn)_3O_4$ | 0.01 | B |
| Ex. 13 | 0.33 | $(La,Sr)MnO_3$ | 0.97 | A |
| Ex. 14 | 0.55 | $Al_2O_3$—NiO | 0.55 | A |
| Ex. 15 | 0.04 | $Al_2O_3$—NiO | 0.05 | A |
| Ex. 16 | 0.72 | $Al_2O_3$—NiO | 0.04 | B |
| Ex. 17 | 0.35 | $Al_2O_3$—NiO | 0.02 | B |
| Ex. 18 | 0.09 | $Al_2O_3$—NiO | 0.01 | B |
| Ex. 19 | 0.01 | $SiO_2$ | 0.98 | A |
| Ex. 20 | 0.64 | $SiO_2$—CaO-based crystallized glass | 0.99 | A |
| Ex. 21 | 0.35 | $SiO_2$—BaO-based crystallized glass | 0.89 | A |
| Ex. 22 | 0.42 | MgO—CaO-based crystallized glass | 0.98 | A |
| Ex. 23 | 0.02 | MgO—$B_2O_3$-based crystallized glass | 0.95 | A |
| Ex. 24 | 0.66 | $SiO_2$—$B_2O_3$-based amorphous glass | 0.92 | A |
| Comp. Ex. 1 | 0.25 | $Co_3O_4$ | 0 | C |
| Comp. Ex. 2 | 0.46 | NiO | 0 | C |
| Comp. Ex. 3 | 0.19 | $Fe_2O_3$ | 0 | C |

As shown in Table 1, with Examples 1 to 24 provided with a covering layer containing a low-equilibrium oxygen pressure element whose equilibrium oxygen pressure is lower than that of Cr, separation of the covering layer was inhibited, compared to Comparative Examples 1 to 3. The reason why such results were obtained was that the oxygen partial pressure of the vicinities of the anchor portions was reduced through a reaction between the oxygen that permeated the covering layer and the low-equilibrium oxygen pressure elements and the forms of the anchor portions were maintained for a long period of time.

Also, as shown in Table 1, in Examples 1 to 24, with Examples 1 to 3, 7 to 9, 13 to 15, and 19 to 24 in which the cation ratio of the low-equilibrium oxygen pressure elements whose equilibrium oxygen pressure was lower than that of Cr was 0.05 or more, separation of the covering layer was further inhibited.

Note that as shown in Table 1, it was confirmed that the effect of inhibiting the separation of a covering layer resulting from the covering layer containing a low-equilibrium oxygen pressure element was obtained regardless of the type of low-equilibrium oxygen pressure element.

The invention claimed is:

1. A cell stack device comprising:
an electrochemical cell; and
an alloy member, wherein
the alloy member is a manifold for supporting a base end portion of the electrochemical cell and comprises:
a base member including a plurality of recesses in a surface thereof and constituted by an alloy material containing chromium;
an anchor portion disposed in each of the recesses and containing an oxide including manganese, each of the anchor portions having an outer surface comprising a first outer surface that is in contact with the recess and a second outer surface that is not in contact with the recess; and
a covering layer connected directly to and completely covering the second outer surface of each anchor portion and containing a low-equilibrium oxygen pressure element whose equilibrium oxygen pressure is lower than the equilibrium oxygen pressure of chromium,
the anchor portions have a different composition from the covering layer and the covering layer is formed by applying a ceramic paste material containing the low-equilibrium oxygen pressure element onto the surface of the base member and performing a heat treatment.

2. The cell stack device according to claim 1, wherein a cation ratio of the low-equilibrium oxygen pressure element in the covering layer is 0.05 or more.

3. The cell stack device according to claim 1, wherein the low-equilibrium oxygen pressure element is manganese.

4. The cell stack device according to claim 1, wherein the covering layer is a ceramic material.

5. The cell stack device according to claim 4, wherein the ceramic material comprises at least one member selected from the group consisting of alumina, silica, zirconia, crystallized glass and a combination thereof.

6. The cell stack device according to claim 4, wherein the ceramic material comprises at least one member selected from the group consisting of a perovskite complex oxide and a spinel complex oxide.

* * * * *